United States Patent [19]

Mergelsberg et al.

[11] Patent Number: 4,867,999
[45] Date of Patent: Sep. 19, 1989

[54] METHOD FOR HEAT-TREATING CANDY MASSES

[75] Inventors: Reinhard Mergelsberg, Garbsen; José de Vilchez, Hanover; Klaus Markwardt, Laatzen; Jürgen Schlüter, Langenau, all of Fed. Rep. of Germany

[73] Assignee: Otto Hänsel GmbH, Hanover, Fed. Rep. of Germany

[21] Appl. No.: 127,071

[22] Filed: Dec. 1, 1987

[30] Foreign Application Priority Data

Dec. 3, 1986 [DE] Fed. Rep. of Germany ....... 3641223

[51] Int. Cl.⁴ ............................................. A23G 3/02
[52] U.S. Cl. .................................... 426/520; 426/474; 426/660
[58] Field of Search ............... 426/474, 660, 572, 519, 426/520

[56] References Cited

U.S. PATENT DOCUMENTS

| | | | |
|---|---|---|---|
| 1,173,873 | 2/1916 | Savy | 426/474 |
| 4,487,118 | 12/1984 | Hansel et al. | 426/660 |
| 4,670,272 | 6/1987 | Chen et al. | 426/572 |
| 4,705,654 | 11/1987 | Niwa et al. | 261/128 |

Primary Examiner—George Yeung
Attorney, Agent, or Firm—Max Fogiel

[57] ABSTRACT

Method of and device for heat-treating candy masses with heat exchangers. A gas, compressed air for instance, is injected subject to regulation of its pressure and volume into the mass before the latter enters the heat exchanger. The result is a regulated turbulence inside the heat exchanger that makes the heat transfer more efficient.

5 Claims, 1 Drawing Sheet

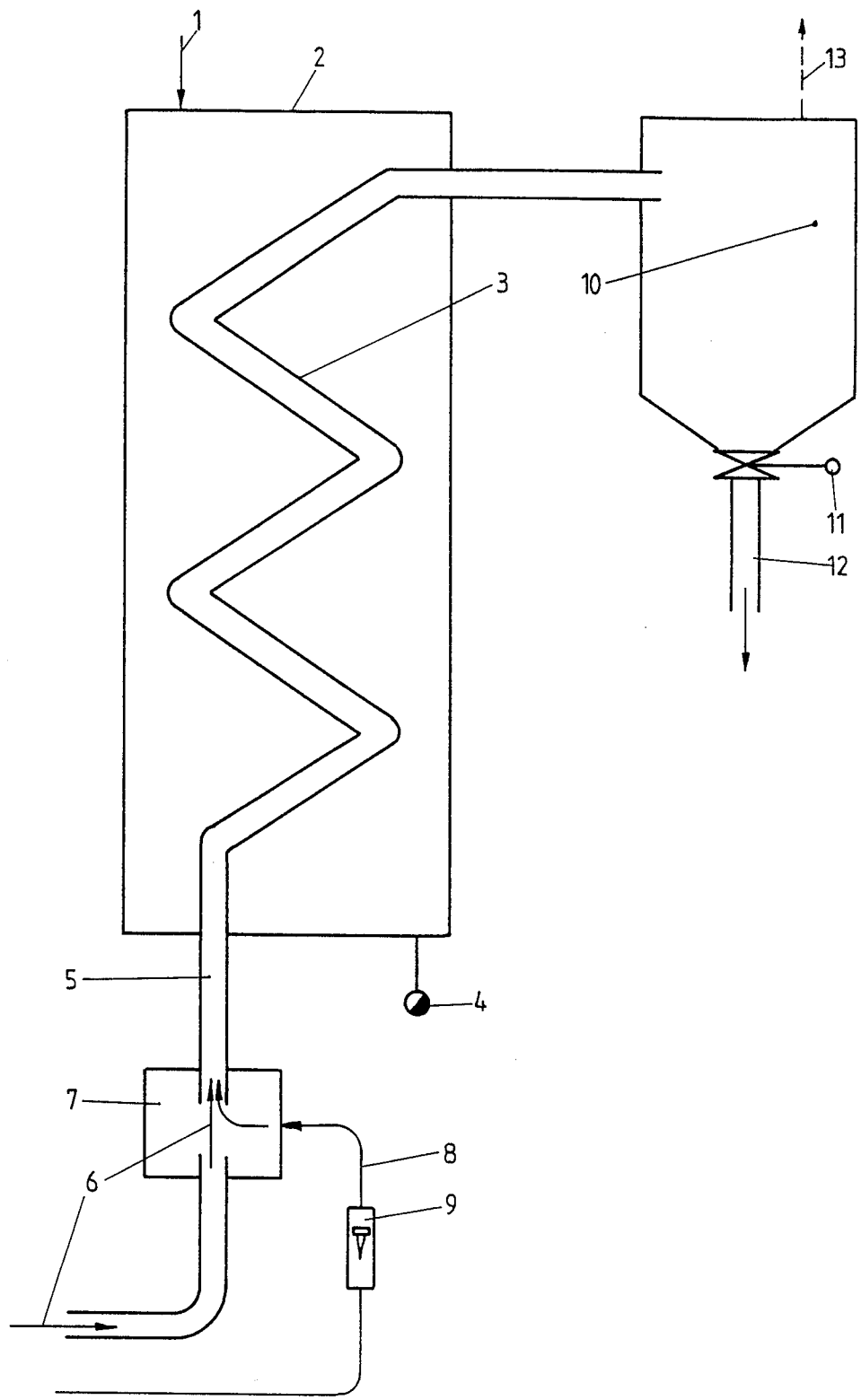

METHOD FOR HEAT-TREATING CANDY MASSES

The present invention concerns a method of and a device for heat-treating candy masses with heat exchangers.

Conveying masses of this type, like sugar solutions or sugar-and-glucose slurries, which can be pumped, through the heating coil of a heat exchanger surrounded by a steam-heated space is known. Heat is accordingly exchanged and heats up the mass being treated. The amount of heat transferred per unit of time depends, aside from the amount of materials employed and their dimensions, on the difference in temperature between the steam and the candy mass as well as on the flow situation inside the coil of the heat exchanger.

To improve the transfer of heat it is necessary to obtain a temperature difference that is as wide as possible, which results, however, in the mass being treated scorching very easily, so that limits must be established.

Positioning various structures in the heating coil to increase the turbulence of the candy mass inside it is another known means of improving heat transfer. One drawback to doing so, however, is that dead spaces frequently occur at the structures, in which the mass remains for an uncontrollable length of time and becomes scorched. It is very difficult to clean coils of this type, and it demands a lot of labor even though the results cannot be guaranteed.

Furthermore, since it is impossible to regulate the turbulence during operation, the process cannot be controlled.

The object of the present invention is to improve this situation and to provide a method and a device for carrying it out that will not only improve the efficiency of heat transfer but will also slow the overall process to be precisely controlled, without entailing the risk that the candy mass being treated will at least to some extent scorch and become spoiled.

This object is attained in accordance with the invention in that the mass is exposed to a gas, air for instance, before it enters the heat exchanger and it is the resulting mixture that is supplied to the exchanger. Injecting the gas increases the volume of the mass to the extent that the different volumetric ratios improve the heat transfer. Still more important, however, is that the injected gas generates turbulence in the mass that ensure that it will be constantly agitated inside the heat exchanger, and any heat absorbed by the mass at the wall of the exchanger will immediately be conveyed away. This action considerably increases the efficiency of the heat exchanger. No special structures need to be installed. Especially sensitive masses can be processed because the temperature difference can be much narrower. Since the dimensions of the heat exchanger can also be decreased, the overall system can be manufactured considerably more cost-effectively.

Compressed air, heated ahead of time if necessary, is a very practical gas in accordance with the invention. The mass is preferably intercepted in a collector as it leaves the heat exchanger to allow the initially injected compressed air to escape.

Positioned at the intake into the heat exchanger is a mechanism for introducing or injecting the gas. The gas is supplied over a line that contains a variable valve. The overall device is extremely simple in design and requires no additional components, positioned inside the heat exchanger for example. It is accordingly very easy to clean, and there are no dead spaces in the exchanger for the mass to remain in too long.

One embodiment of the invention will now be described with reference to the drawing, which is a schematic illustration of the heat exchanger in accordance with the invention.

Heat is exchanged in a heat exchanger 1, which can essentially be of a conventional design, consisting of a housing 2 with a heating coil 3 inside it. Hot steam flows through housing 2. There is an outlet 4 for draining off any condensate.

A candy mass 5 flows through heating coil 3 in the direction indicated by arrow 6. Positioned at the intake end of heating coil 3 is an injector 7 that introduces a gas, air for instance, into mass 5. The gas arrives in injector 7 through a line 8. Line 8 contains a valve 9 that regulates the supply of gas.

At the outlet end of heat exchanger 1, heating coil 3 leads into a collector 10. An outflow line 12 for mass 5 communicates with collector 10 through a check valve 11. Collector 10 is closed on all sides and can have an opening 13 for extracting vapors or the initially injected gas at the top.

Gas, preferably compressed air, is introduced into the candy mass by means of injector 7, producing a mixture of mass and air. The volume of the mass being conveyed through heating coil 3 is accordingly altered to the benefit of heat transfer. More important, however, is that the injected air generates constant turbulence in the mass, leading to its constant agitation inside the coil. Any heat absorbed at the wall of heating coil 3 is accordingly instantly diverted, essentially increasing the efficiency of the device. The difference in temperature between the steam and the mass can accordingly be maintained relatively narrow, and even especially sensitive mass that could not be handled by conventional means can be processed. Heat exchanger 1 can in certain situations be smaller because of the beneficial effect of the injected air on efficiency.

It is practical to heat the air before it is injected into mass 5 to augment the effect of the heat.

The heated mass leaves heat exchanger 1 and arrives in collector 10, where it settles, allowing the initially injected air to escape. Collector 10 can for this purpose be positioned at the top in the vicinity of gas-extraction opening 13, which the air escapes through.

The overall process can be precisely controlled because the injected air is precisely metered by valve 9. Regulation is accordingly possible over a wide range, very readily allowing continuous automatic control. The mass can be continuously conveyed through the heat exchanger. No complicated moving parts inside the heat exchanger are necessary. Since structures inside the heating coil are also unnecessary, it is very easy to clean.

We claim:

1. A method for heat-treating candy masses with heat exchangers, comprising the steps: injecting a gas into a candy mass as said mass enters a heating coil of a heat exchanger to form a mixture of candy mass and gas; conveying the resultant mixture through the heat exchanger to heat the candy mass, said gas being injected at the beginning of said coil for increasing the volume of mixture of gas and candy mass and for generating constant turbulence in the candy mass to move said mixture faster through the coil of said heat exchanger and to increase the heat transfer from the heat exchanger to the mixture; supplying the heated mixture leaving the heat exchanger to a collector; and removing vapor and the injected gas from the candy mass in said collector.

2. A method for heat-treating candy masses with heat exchangers, comprising the steps: heating gas comprising compressed air and injecting the heated gas into a candy mass as said mass enters a heating coil of a heat exchanger to form a mixture of candy mass and gas; conveying the resultant mixture through the heat exchanger to heat the candy mass, said gas being injected at the beginning of said coil for increasing the volume of the mixture of gas and candy mass and for generating constant turbulence in the candy mass to move said mixture faster through the coil of said heat exchanger and to increase the heat transfer from the heat exchanger to the mixture; supplying the heated mixture leaving said heat exchanger to a collector; and removing vapor and the injected gas from the candy mass in said collector.

3. A method as defined in claim 1, wherein said gas after being injected is homogenously mixed with said candy mass.

4. A method as defined in claim 1, including the step of heating said gas before injecting into said candy mass.

5. A method as defined in claim 1, wherein said gas comprises compressed air.

* * * * *